Dec. 4, 1956 P. A. GROBEY 2,772,481
GAGE HAVING DAMPED GAGING MOVEMENT
Filed Sept. 17, 1953 3 Sheets-Sheet 2

INVENTOR.
Paul A Grobey
BY Martin Kirkpatrick
ATTORNEY

Dec. 4, 1956 P. A. GROBEY 2,772,481
GAGE HAVING DAMPED GAGING MOVEMENT
Filed Sept. 17, 1953 3 Sheets-Sheet 3

INVENTOR.
Paul A Grobey
BY
Martin Kirkpatrick
ATTORNEY

United States Patent Office 2,772,481
Patented Dec. 4, 1956

2,772,481

GAGE HAVING DAMPED GAGING MOVEMENT

Paul A. Grobey, Springfield, Vt., assignor to Bryant Chucking Grinder Company, Springfield, Vt., a corporation of Vermont Application September 17, 1953, Serial No. 380,805

6 Claims. (Cl. 33—147)

This invention relates to gages for workpieces and particularly to gages for the gaging of threaded workpieces. It has for an object to provide a relatively simple gage especially useful for the accurate gaging by unskilled persons of large numbers of identical threaded workpieces, and yet at the same time one which may readily be adapted for the gaging of workpieces of different sizes and configurations.

It is a feature of my novel gage that it may be positively maintained in either gaging or non-gaging position, thus allowing an operator the use of both hands in the placing or the removal of a workpiece or while the workpiece is in gaging position.

Another feature of my novel gage is the provision of an extraordinarily simple damping means which provides a relatively slow movement from non-gaging to gaging position so that the gage elements will not be damaged or unduly worn by their striking the workpiece when the gage is moved from non-gaging to gaging position. Thus the gage may simply be released from non-gaging position and will control its own movement into gaging position. This is particularly advantageous when a gage is operated by relatively unskilled persons who might otherwise close the gage on the workpiece too rapidly and damage the gage elements.

A still further feature of my novel gage is its ready adaptation to either internal or external gaging which require different directions of gage element movement, an internal gage being opened into gaging position and an external gage being closed into gaging position. Heretofore, a separate gage has commonly been used for each type of gaging, but by a simple reversal of the gage element mountings my novel gage may be quickly altered from an internal to an external gage, or vice versa. Furthermore, such reversal requires no adjustment of the gage other than the usual setting to a standard workpiece and thus may be performed by relatively unskilled gage operators.

Other objects and features of my invention will be apparent from the following description of preferred embodiments thereof together with the appended drawings, in which Fig. 1 is a plan view of a gage of the invention arranged as an internal gage;

Figure 1:
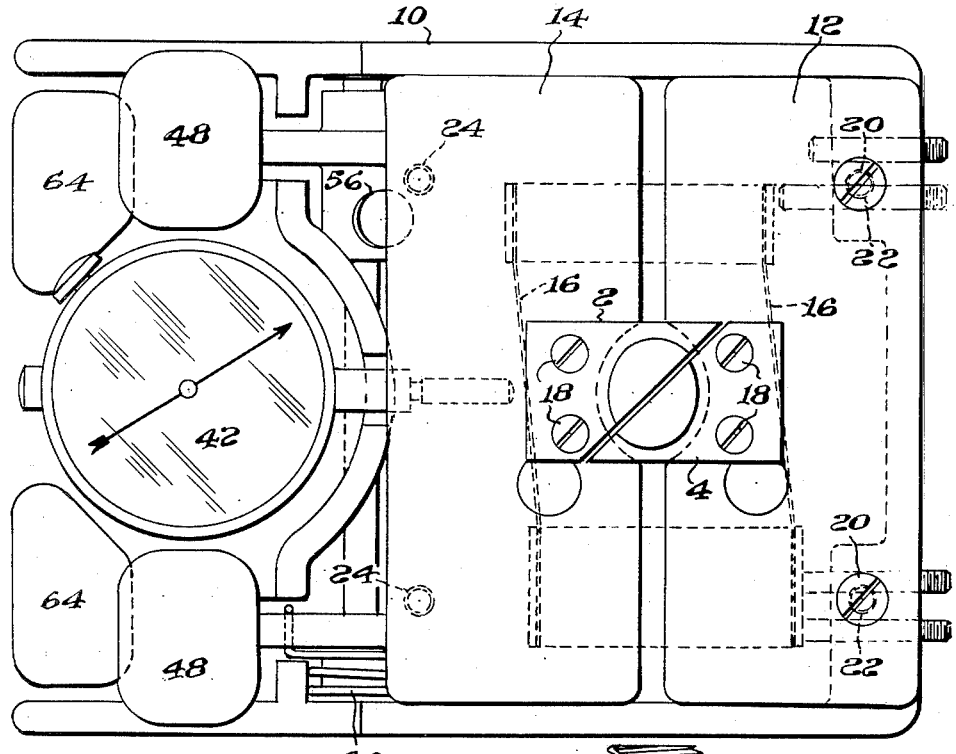
Figure 2:
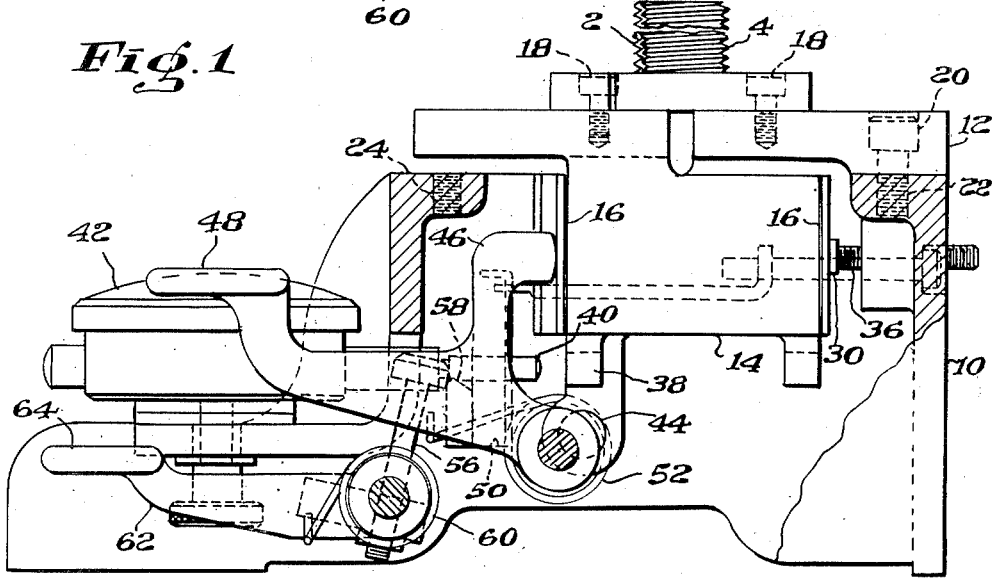
Fig. 2 is a side elevational view, partly broken away, of the gage of Fig. 1.
Figure 3:
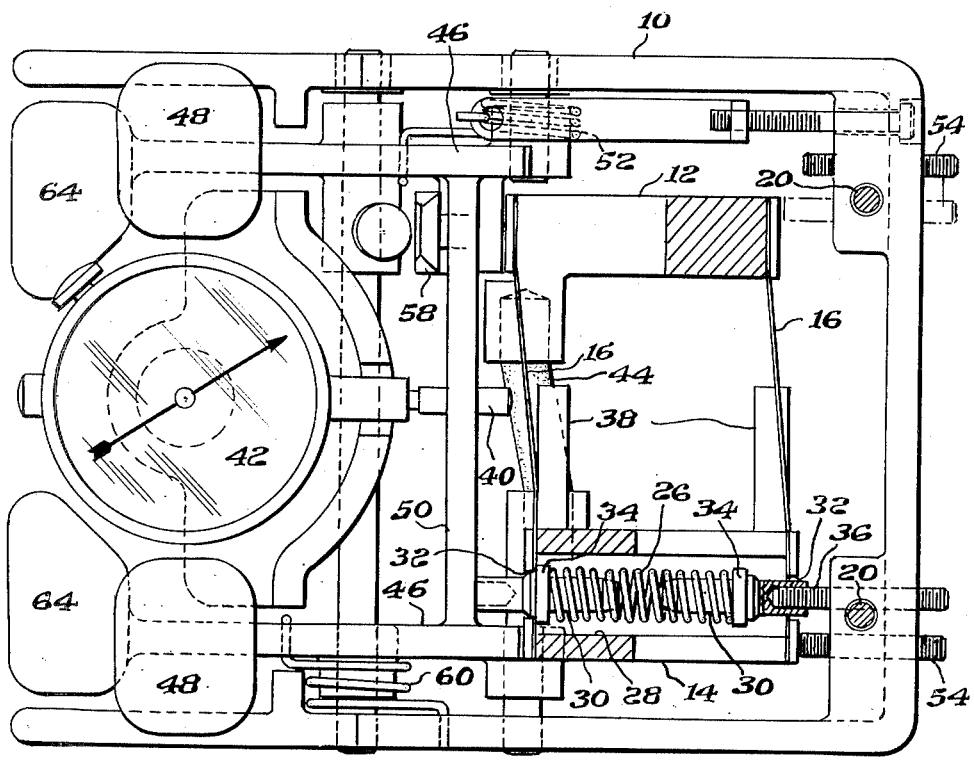
Fig. 3 is a top view of the gage of Fig. 1, with a portion thereof broken away.

Referring to Figs. 1, 2 and 3 the gage of this invention includes a frame 10 having mounted thereon a pair of gage element supporting members 12 and 14 connected together by a pair of spaced parallel reeds 16. Each of these reeds is secured at one end to the supporting member 12 and at the other end to the supporting member 14 and extend generally transversely of frame 10 on opposite sides thereof. The reeds 16 are of substantial width, thus to provide a structure affording substantial resistance to relative motion of the members in a direction parallel to the plane of the reeds, but permitting the members to be moved relatively to one another in a plane perpendicular to that of the reeds, and in a substantially rectilinear direction.

The upper portions of the members 12 and 14 are relatively flat and adapted to support suitable gage elements, said gage elements being mounted on said members by machine screws 18 fitting into tapped holes in said support members. Since the gage shown in Figs. 1 through 3 is intended for internal thread gaging, gage elements 2 and 4 have their shank portions externally threaded for gaging engagement with the internal threads of a workpiece. Other gage elements may readily be substituted by the removal of screws 18.

The fixed supporting member 12 is detachably mounted on frame 10 by a pair of machine screws 20, two pairs of tapped holes being provided in said frame so that the supporting members may be reversed in position on said frame. In Figs. 1 through 3, the machine screws 20 are shown engaged with tapped holes 22 adjacent the rear wall of frame 10, the tapped holes 24 adjacent the forward wall of frame 10 being unused in this gage configuration. The movable supporting member 14, movably connected to fixed supporting member 12 by reeds 16 is carried thereby, said movable member extending a greater distance from the center line of the gage than the fixed member 12, so that the fixed member is spaced a greater distance from the side wall of frame 10 in such position. The movable member 14 is provided with spring means carried thereby and interposed between said movable member and the rear wall of frame 10 to urge the gage elements 2 and 4 mounted on the supporting members into gaging position. The spring means is adapted for reversible operation and includes a coil spring 26 mounted within a recess 28 in the movable member 14, each end of said coil spring being engaged with a guide pin 30 passing through bores 32 in the end walls of said member 14 but retained within said recess 28 by a shoulder 34 thereon. The outer ends of pin 30 are provided with recesses which may be engaged by the end of a screw 36 adjustably mounted in the rear wall of frame 10, a pair of said screws, one adjacent each side of frame 10, being provided for reversible operation of the gage. Arms 38 are also provided on both ends of said support member to engage with the actuating stem 40 of a dial indicator 42 mounted on frame 10 so that said dial indicator will be responsive to relative movement between the supporting members 12 and 14.

Damping means is provided between the supporting members 12 and 14, said damping means comprising a flexible member 44 of a synthetic plastic material such as an ethoxylene resin or the like, for example, Araldite, manufactured by the Ciba Company. Such a material has a high temporary set characteristic to provide a low recovery rate when the supporting members 12 and 14 are displaced from gaging position, the damping member 44 being so connected to said members as to be substantially straight when said members are in gaging position. Thus the flexible damping member 44 will exert no force on the supporting members in gaging position, but when they are moved to non-gaging position and released, it will slowly return them to gaging position under the influence of coil spring 26 in movable supporting member 14.

A pair of actuating levers 46 are pivotably mounted on opposite sides of frame 10, said levers having operating keys 48 and a common rigid connecting member 50 so that the levers move in synchronism. The levers 46 are equally spaced at a distance from the gage centerline and the sides of frame 10 at a distance such that one of said levers is in operative contact with the movable supporting member 14 in either position of the supporting members 12 and 14, and the other of said levers 46 is laterally spaced outwardly from the fixed supporting member 12 so that it will not contact said member in either position of said members, the movable supporting member 14 extending further outwardly from said centerline than the fixed supporting member 12 as set forth above. A coil spring 52 is provided between said levers and the frame 10 to urge the operative lever 46 into contact with the end of movable supporting member 14 to close the gage elements 2 and 4 into non-gaging position, said spring 52 being powerful enough to overcome the effect of coil spring 26, reeds 16 and connecting member 50 positively to maintain the gage in non-gaging position. Preferably, adjustable stop screws 54 are provided on either side of the rear wall of frame 10 to limit the rearward movement of movable supporting member 14 under the influence of spring 52.

A latch is provided positively to maintain the actuating levers in non-operative position out of engagement with movable supporting member 14, said latch including a latch member 56 pivotally mounted on frame 10 for engagement with a lug 58 on the actuating lever connecting member 50. A spring 660 is provided to maintain latch member 56 in latched position on top of lug 58. The latch member 56 is provided with a pair of release levers 62 having keys 64 on each side of said frame for releasing the latch from engaged relation with lug 58 to allow the actuating lever to move the movable supporting member 14 to non-gaging position.

To use the gage of Figs. 1 through 3, it is first set in non-gaging position as shown in Figs. 1 through 3 with an actuating lever in contact with the end of movable supporting member 14 to move the internal gage elements together into their closed, non-gaging position and there positively maintain them to provide clearance for the threads of a workpiece which may then be placed over the gage elements 2 and 4. With the workpiece in position, the gage may be released to open, gaging position by pressing down on an actuating lever key 48 which automatically locks the actuating levers 46 in disengaged position by latch 56. The rate of movement of movable member 14 being controlled by damping member 44, the gage elements 2 and 4 will move away from one another and into open gaging position at a relatively slow rate until the gage elements engage the workpiece and remain positively maintained in gaging position. The indicator actuating stem 40 will then be engaged with one of arms 38 on movable supporting member 14 to give a reading on indicator 42, it being assumed that the gage has been previously set to a standard ring in the usual manner. After the deviation from standard diameter has thus been determined, a latch key 64 is pressed downwardly to release the latch 56 and permit actuating levers 46 to be moved by their spring 52 so that one of said levers contacts movable support member 14 and moves it from gaging into non-gaging position.

Figure 4:
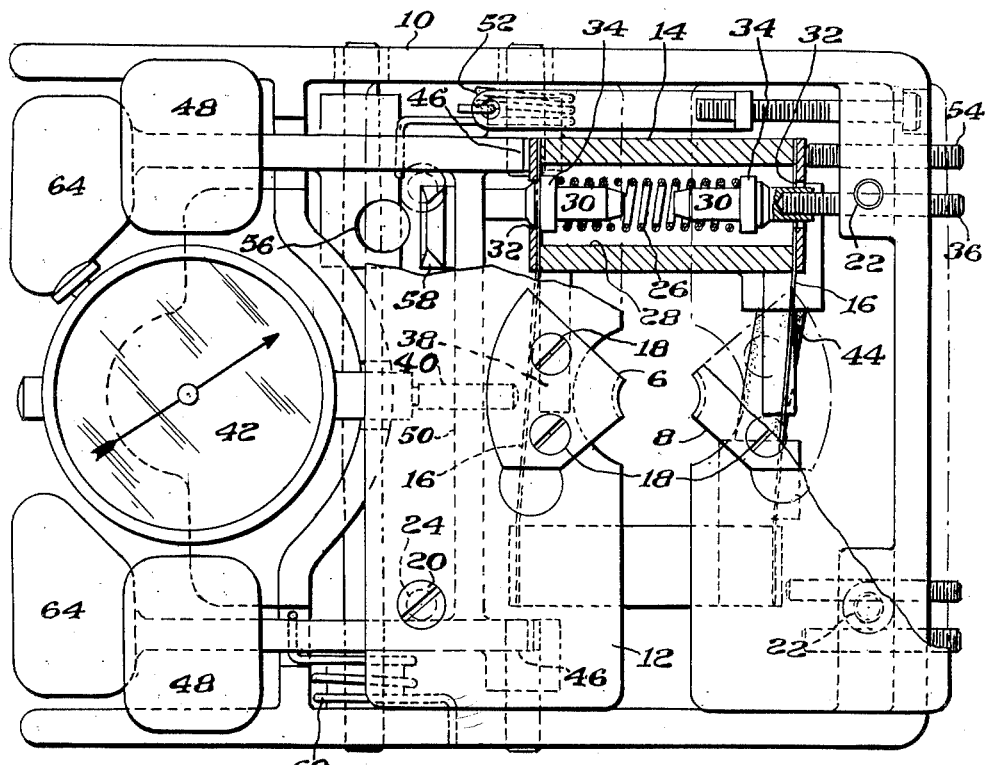
Fig. 4 is a plan view, partly broken away, of the gage of Fig. 1 arranged as an external gage.
Figure 5:
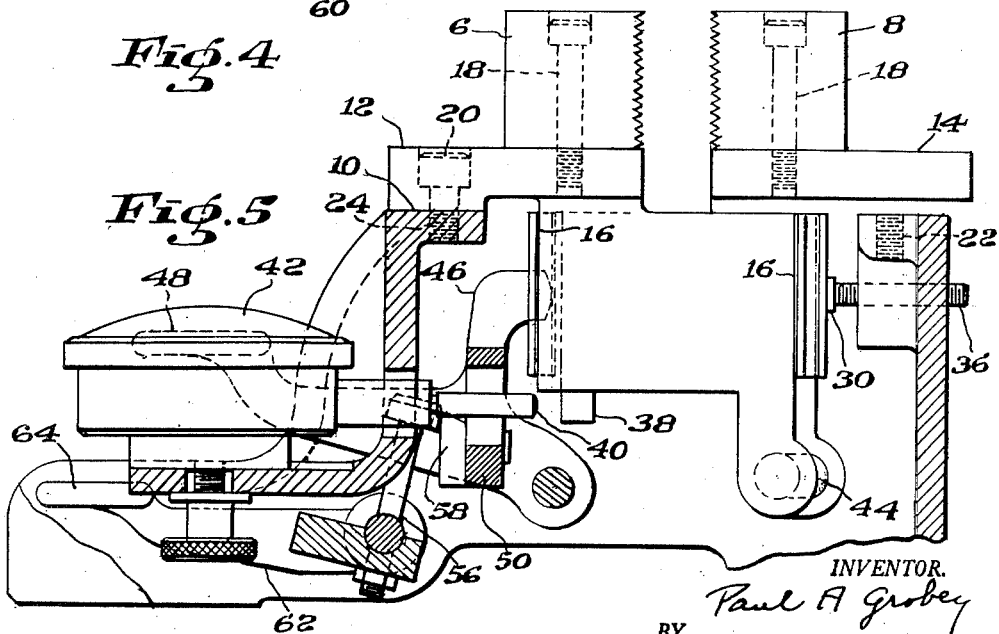
Fig. 5 is a side elevational view, partly broken away of the gage of Fig. 4.

In Figs. 4 and 5 is shown the gage of Figs. 1 through 3 with the supporting members 12 and 14 in reversed position on frame 10 to provide an external gage. For such a gage, suitable external gage elements 6 and 8 are mounted on supporting members 12 and 14 and the fixed supporting member 12 is mounted at the forward end of frame 10 by machine screws 20 engaging with tapped holes 24 adjacent the forward wall of said frame, the tapped holes 22 being unused in this gage configuration. The reversal of the supporting members will result in the movable supporting member 14 being on the opposite side of frame 10 and in reversed position from that of the configuration of Figs. 1 through 3, but the pair of actuating levers 46 provides for rearward movement of the movable supporting member 14 in either position, and likewise the provision of pairs of movable member engaging screws 36 and stop screws 54 will act likewise, since each end of the coil spring 26 in the movable member recess 28 is provided with an identical pin 30 to engage with screw 36. The actuating stem 40 of dial indicator 42 will also be operated in either position by one of the movable support member arms 38.

In the operation of the external gage configuration of Figs. 4 and 5, the displacement of movable supporting member 14 by an actuating lever 46 opens the gage elements 6 and 8 so that a workpiece may be placed between them. Removal of actuating lever pressure by pressing key 48 will then allow the gage elements 6 and 8 to move toward one another into gaging position, the damping member 44 providing a slow rate of movement and the indicator being actuated by arm 38 as before. Release of actuating levers 46 by pressing release key 64 will return the gage elements 6 and 8 to open non-gaging position.

Thus it will be seen that the invention provides a surprisingly simple yet universal gage readily used by unskilled persons for the accurate gaging of workpieces. It will be apparent to those skilled in the gage art that various modifications may be made in my novel gage within the spirit of my invention and the scope of the appended claims.

I claim:

1. A gage comprising a pair of gage element supporting members, a gage element on each of said supporting members, means supporting one of said members for yielding substantially rectilinear motion relative to the other of said members in a direction to move said gage elements toward and away from one another to open and close said gage elements, damping means connecting said supporting members, said damping means comprising a flexible member of a material having high temporary set characteristics to provide a low recovery rate when said supporting members are displaced from gaging position, and indicating means responsive to the relative displacement of said supporting members.

2. A gage comprising a pair of gage element supporting members, a gage element on each of said supporting members, a pair of reeds arranged in parallel relation, one end of each of said reeds being secured respectively to one end of each of said members, said reeds supporting one of said members for yielding substantially rectilinear motion relative to the other of said members in a direction to move said gage elements toward and away from one another to open and close said gage elements, damping means connecting said supporting members, said damping means comprising a flexible member of a material having high temporary set characteristics to provide a low recovery rate when said supporting members are displaced from gaging position, and indicating means responsive to the relative displacement of said supporting members.

3. A gage comprising a frame, a pair of gage element supporting members mounted on said frame, one of said supporting members being maintained in fixed position relative to said frame and the other maintained in movable position relative to said frame, said supporting members being detachably mounted on said frame and adapted to be reversed in position thereon, a gage element on each of said supporting members, a pair of reeds arranged in parallel relation, one end of each of said reeds being secured respectively to the other of said members, said reeds supporting one of said members for yielding substantially rectilinear motion relative to the other of said members in a direction to move said gage elements toward and away from one another to open and close said gage elements, damping means connecting said supporting members to provide a low recovery rate when said supporting members are displaced from gaging position, actuating means mounted on said frame adapted to displace said movable supporting member relative to said fixed supporting member into non-gaging position, latch means adapted releasably to maintain said supporting members in non-gaging position, and indicating means mounted on said frame responsive to the relative displacement of said supporting members.

4. A gage comprising a frame, a pair of gage element supporting members mounted on said frame, one of said supporting members being maintained in fixed position relative to said frame and the other maintained in movable position relative to said frame, said supporting members being detachably mounted on said frame and adapted to be reversed in position thereon, a gage element on each of said supporting members, a pair of reeds arranged in parallel relation, one end of each of said reeds being secured respectively to the other of said members, said reeds supporting one of said members for yielding substantially rectilinear motion relative to the other of said members in a direction to move said gage elements toward and away from one another to open and close said gage elements, spring means interposed between said frame and said movable supporting member arranged to urge said supporting member into gaging position, damping means connecting said supporting members to provide a low recovery rate when said supporting members are displaced from gaging position, actuating means mounted on said frame adapted to displace said movable supporting member relative to said fixed supporting member into non-gaging position, latch means adapted releasably to maintain said supporting members in non-gaging position, and indicating means mounted on said frame responsive to the relative displacement of said supporting members.

5. A gage comprising a frame, a pair of gage element supporting members mounted on opposite sides of said frame, one of said supporting members being maintained in fixed position relative to said frame and the other maintained in movable position relative to said frame, said supporting members being detachably mounted on said frame and adapted to be reversed in position thereon, a gage element on each of said supporting members, a pair of reeds arranged in parallel relation, one end of each of said reeds being secured respectively to the other of said members, said reeds supporting one of said members for yielding substantially rectilinear motion relative to the other of said members in a direction to move said gage elements toward and away from one another to open and close said gage elements, damping means connecting said supporting members to provide a low recovery rate when said supporting members are displaced from gaging position, actuating means mounted on said frame, said means including an actuating lever adapted to displace said movable supporting member relative to said fixed supporting member into non-gaging position, latch means adapted releasably to maintain said supporting members in non-gaging position, and indicating means mounted on said frame responsive to the relative displacement of said supporting means.

6. A gage comprising a frame, a pair of gage element supporting members mounted on opposite sides of said frame, one of said supporting members being maintained in fixed position relative to said frame and the other maintained in movable position relative to said frame, said supporting members being detachably mounted on said frame and adapted to be reversed in position thereon, a gage element on each of said supporting members, a pair of reeds arranged in parallel relation, one end of each of said reeds being secured respectively to the other of said members, said reeds supporting one of said members for yielding substantially rectilinear motion relative to the other of said members in a direction to move said gage elements toward and away from one another to open and close said gage elements, spring means interposed between said frame and said movable supporting member arranged to urge said supporting member into gaging position, damping means connecting said supporting members to provide a low recovery rate when said supporting members are displaced from gaging position, actuating means mounted on said frame, said means including an actuating lever adapted to displace said movable supporting member relative to said fixed supporting member into non-gaging position, latch means adapted releasably to maintain said supporting members in non-gaging position, and indicating means mounted on said frame responsive to the relative displacement of said supporting members.

References Cited in the file of this patent
UNITED STATES PATENTS

| | | |
|---|---|---|
| 1,044,555 | Maul | Nov. 19, 1912 |
| 1,547,514 | Mueller | July 28, 1925 |
| 2,028,611 | Johansson | Jan. 21, 1936 |
| 2,411,292 | Rappl | Nov. 19, 1946 |
| 2,427,924 | Rose | Sept. 23, 1947 |
| 2,553,539 | Bauer | May 22, 1951 |
| 2,588,820 | Gates et al. | Mar. 11, 1952 |

FOREIGN PATENTS

| | | |
|---|---|---|
| 164,575 | Switzerland | Dec. 16, 1933 |